July 4, 1950            H. C. FLINT            2,514,182
RESILIENT SEAT STRUCTURE
Filed April 17, 1946
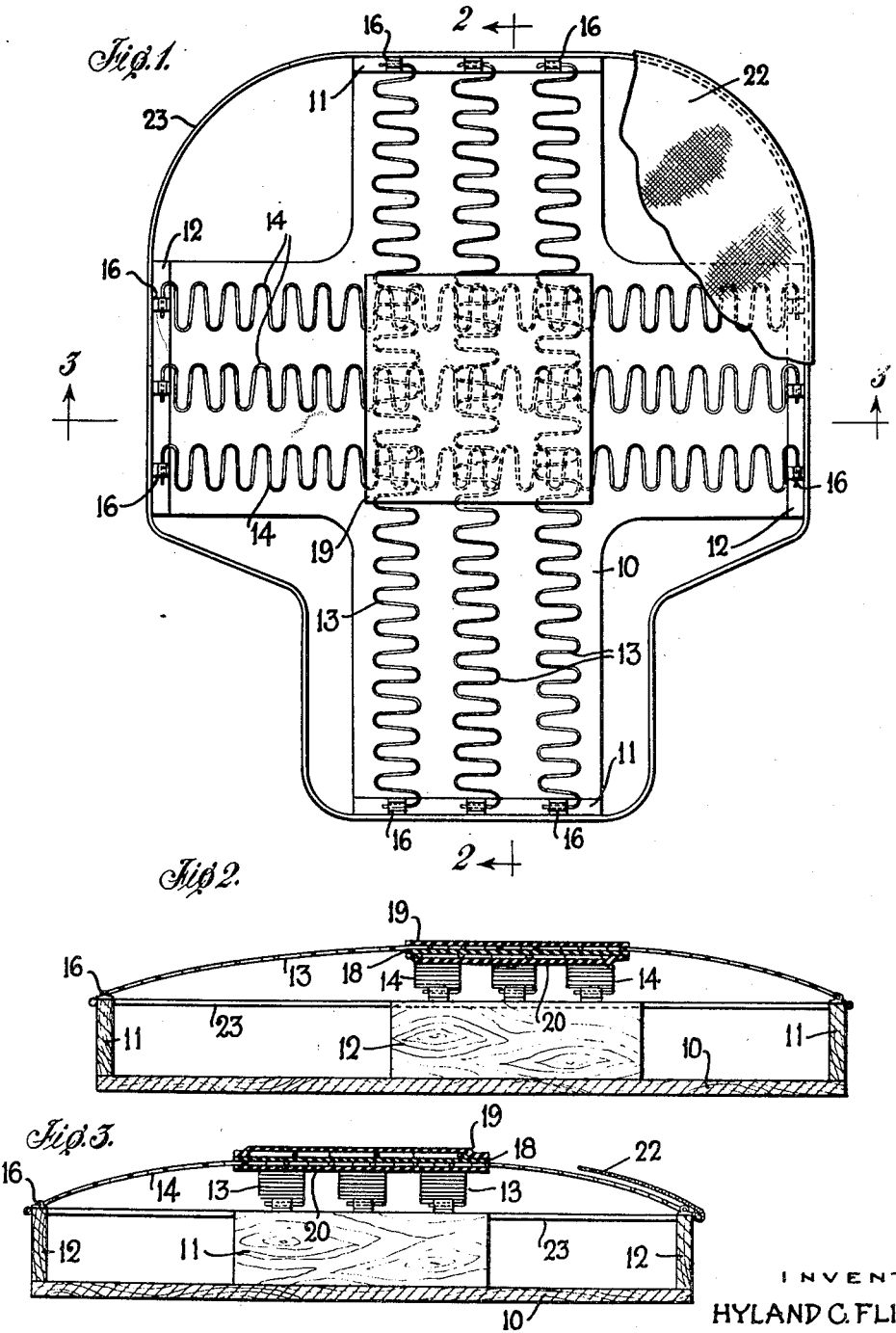
INVENTOR
HYLAND C. FLINT
BY
ATTORNEYS Patented July 4, 1950

2,514,182

UNITED STATES PATENT OFFICE 2,514,182

RESILIENT SEAT STRUCTURE

Hyland C. Flint, Akron, Ohio, assignor to The Firestone Tire & Rubber Company, Akron, Ohio, a corporation of Ohio Application April 17, 1946, Serial No. 662,812

3 Claims. (Cl. 155—179)

This invention relates to resilient seat structures such as may be used, for example, in motor vehicles, railway coaches, agricultural vehicles and the like, and more especially it relates to seat structures that include wire springs as a means for imparting resilience thereto.

The invention is of primary utility in its application to seat structures employing spring elements of the type shown in U. S. Patent No. 2,002,399 to K. Kaden. The spring elements of said patent are each composed of a single wire bent in a succession of sinuosities or undulations extending the entire length of the element, the element as a whole having an arcuate permanent set. Such spring units usually are mounted side by side in parallelism and their ends anchored, at which time their arc of curvature is substantially flattened as compared to normal. Experience has shown that at least six of these springs are required for adequately supporting a person of average weight. Thus when six of the spring units are arranged side by side, the seat is of substantial width, frequently greater than the width desired. Furthermore, such arrangement does not lend itself to the rounded corners or arcuate margins desired in some types of seats, or to the irregular contours of some special types of seats. Moreover, spring units of the character mentioned have lateral instability, resulting in greater resilience of a seat in one direction than in the direction transversely thereof. It is to the relief of these objectionable features that this invention primarily is directed.

The chief objects of the invention are to provide in an improved manner for the employment of the Kaden type springs aforementioned in resilient seat structures; to provide a spring construction for seats that is readily adaptable to seats of irregular shape, rounded corners or arcuate margins; and to provide a resilient seat structure of uniform stability in all directions. Other objects will be manifest as the direction proceeds.

Of the accompanying drawing:

Fig. 1 is a plan view of a resilient seat structure embodying the invention, a portion of a cover thereover being broken away to reveal underlying construction;

Fig. 2 is a section on the line 2—2 of Fig. 1; and

Fig. 3 is a section on the line 3—3 of Fig. 1.

Referring to the drawing, there is shown a seat structure comprising a frame having a base 10 that is of general cruciform shape in plan, said base having front and rear rails 11, 11 rising therefrom, and similar lateral rails 12, 12 at each side thereof, said rails being of relatively short length as compared to the total length and breadth of the seat structure. The frame as shown is composed of wood, although other suitable material may be used if desired. Spanning the space between the front and rear rails 11, 11 is a series of wire spring units 13, 13 herein shown as three in number, said spring units being arranged in parallelism and connected at their opposite ends to said rails 11. In like manner a series of similar wire spring units 14, 14 span the space between lateral rails 12, 12 and are secured at their opposite ends to said rails, the spring units 14 underlying the spring units 13. All of said spring units are of the type that constitutes the subject matter of the Kaden patent aforementioned. Each spring unit is composed of a single, tempered steel wire that is bent into a succession of curves of sinuous or serpentine form extending the length of the unit. The unit also has an arcuate permanent set longitudinally on a relatively short radius. When mounted for use, as shown herein, with its convex side uppermost, the unit is somewhat flattened so that it has a longer radius of longitudinal curvature. Thus, during use, upon vertical deflection, the spring does not close upon itself and is continuously urged to return to its normal position, and retains its efficiency throughout the full extent of its vertical travel.

For mounting the spring units 13, 14, identical anchor members 16 are provided, said anchor members being mounted upon the upper margins of the base-rails 11 and 12. Each anchor member consists of a metal strap bent to form an eye or loop through which loop the terminal portion of a spring unit wire extends, the arrangement being such that the wire may swivel therein as the spring unit is deflected.

In order that the springs 13, 14 will not spread apart with relation to each other, and to avoid friction between the two series of springs, means is provided for maintaining said two series of springs in separated relation, yet providing a yielding resilient connection between them. To this end a layer of rubber or rubber-like composition 18 is interposed between the spring units 13 and 14 in the region where they intersect each other, a similar layer of material 19 is overlaid upon the units 13 in the same region, and a similar layer 20 underlies the units 14. Said layers 18, 19 and 20 are vulcanized in situ under pressure so that the rubber flows around the wires of the spring units and coalesces into a homogeneous structure with the wires embedded and confined therein. In Figs. 2 and 3 of the drawings the layers 18, 19 and 20 are shown as individual sheets of material before vulcanization, and relatively thicker than in actual practise, for clarity of illustration.

It will be noted that the region where the spring units 13, 14 intersect each other, which is the region covered by the resilient plies 18, 19 and 20, is somewhat nearer to the rear of the seat structure than to the front thereof, being located where the load concentration is greatest when a person is sitting upon the seat. It will be apparent that this region may be located at any point desired, and that in the case of wide, double seats, two such regions may be provided simply by adding another group of fore-and-aft spring units.

The seat structure has a top cover 22 of burlap, canvas, or other suitable textile material, which cover is attached at its margin to a heavy border wire 23. The latter is attached to the rails 11, 12 of the seat base 10, and its shape defines the contour of the seat structure. Because of the novel arrangement of the spring units 13, 14, whereby said springs are absent from the corners of the seat, it is possible to shape the contour thereof to fit practically any location where the seat may be employed. The seat shown in Fig. 1, which is much narrower in front than at the rear, is especially designed for agricultural vehicles where the driver usually sits with legs spread apart. It will be understood that the seat structure shown and described serves as a support for the usual cushion, or for any other usual or preferred form of upholstery.

The invention provides a stabilized seat structure, it makes for economy of material, it makes the Kaden type spring adaptable to seat structures of various shapes, and achieves the other advantages set out in the foregoing statement of objects.

Modification may be resorted to without departing from the spirit of the invention or the scope thereof as defined by the appended claims.

What is claimed is:

1. A resilient seat structure comprising a seat frame consisting of a base member of general cruciform shape in plan, lateral rails rising from the opposite sides thereof, said rails being relatively short as compared to the total length and breadth of the frame, a series of parallel upwardly arched sinusoidal spring units, flattened at their centers, extending transversely of the seat and attached to opposite rails, a second series of similar spring units spanning the seat and attached to the other opposite rails, said series crossing each other and having vulcanized rubber completely separating and covering said springs in the region whereof they cross each other, said crossing region being nearer to the rear of the seat than to the front thereof, a heavy border wire secured to the respective rails and being unsupported at the corners of the seat, and being shaped to outline the contour of the seat, and a sheet of textile material overlying the spring units and secured at its margin to said border wire.

2. A resilient seat structure comprising a seat frame consisting of a base member of general cruciform shape in plan, lateral rails rising from the opposite sides thereof, said rails being relatively short as compared to the total length and breadth of the frame, a series of parallel upwardly arched sinusoidal spring units, flattened at their centers, extending transversely of the seat and attached to opposite rails, a second series of similar spring units spanning the seat and attached to the other opposite rails, said series crossing each other in a region of the seat nearer the rear thereof than the front, a heavy border wire secured to the respective rails and being unsupported at the corners of the seat, and being shaped to outline the contour of the seat, and a sheet of textile material overlying the spring units and secured at its margin to said border wire.

3. A resilient seat structure comprising a seat frame consisting of a base member of general cruciform shape in plan, lateral rails rising from the opposite sides thereof, said rails being relatively short as compared to the total length and breadth of the frame, a series of parallel upwardly arched sinusoidal spring units, flattened at their centers, extending transversely of the seat and attached to opposite rails, a second series of similar spring units spanning the seat and attached to the other opposite rails, said series crossing each other and having vulcanized rubber completely separating and covering said springs in the region whereof they cross, a heavy border wire secured to the respective rails and being unsupported at the corners of the seat, and being shaped to outline the contour of the seat, and a sheet of textile material overlying the spring units and secured at its margin to said border wire.

HYLAND C. FLINT.

REFERENCES CITED

The following references are of record in the file of this patent:

UNITED STATES PATENTS

| Number | Name | Date |
| --- | --- | --- |
| 1,480,074 | Huntley | Jan. 8, 1924 |
| 1,697,303 | Bradley | Jan. 1, 1929 |
| 1,725,479 | Rissmann | Aug. 20, 1929 |
| 2,058,165 | McCoy | Oct. 20, 1936 |
| 2,261,996 | Haberstump | Nov. 11, 1941 |
| 2,312,411 | Hopkes | Mar. 2, 1943 |
| 2,341,419 | Bank | Feb. 8, 1944 |